United States Patent [19]

Jolley

[11] 4,213,505
[45] Jul. 22, 1980

[54] TRACTOR IMPLEMENT CARRYING APPARATUS

[76] Inventor: Glenn L. Jolley, Route 2, Box 121, Hutchinson, Minn. 55350

[21] Appl. No.: 933,154

[22] Filed: Aug. 14, 1978

[51] Int. Cl.² .................... A01B 39/26; A01B 39/28
[52] U.S. Cl. .................... 172/510; 172/705; 172/513; 47/1.7
[58] Field of Search .................... 172/705, 7, 509, 510, 172/512, 513, 551, 572, 511, 624

[56] References Cited

U.S. PATENT DOCUMENTS

| | | | |
|---|---|---|---|
| 1,057,984 | 4/1913 | Saunders | 172/510 |
| 1,835,095 | 12/1931 | Schanil | 172/512 X |
| 3,098,529 | 7/1963 | Wade | 172/705 |
| 3,429,379 | 2/1969 | Tebben | 172/510 |
| 3,804,179 | 4/1974 | Johnson | 172/624 |

Primary Examiner—Richard J. Johnson

[57] ABSTRACT

A tractor implement carrying apparatus for use with a farm tractor and for supporting farm implements which can be a rolling shield, high speed sliding shield, disc, or other similar farm implements. An adjustable bushing support member is attached to the lower end of a mounting member to support a pin permitting transverse adjustment of a drawbar pivotally supported on the pin. An implement attaching bracket having opposing transversely adjustable and downwardly extending arms attaches to a longitudinal slot in the drawbar which provides for lateral adjustment of the implement attaching bracket. Opposing tool adjustment brackets are suitably affixed to the lower ends of the opposing transversely adjustable downwardly extending arms for attachment of farm implements.

1 Claim, 7 Drawing Figures

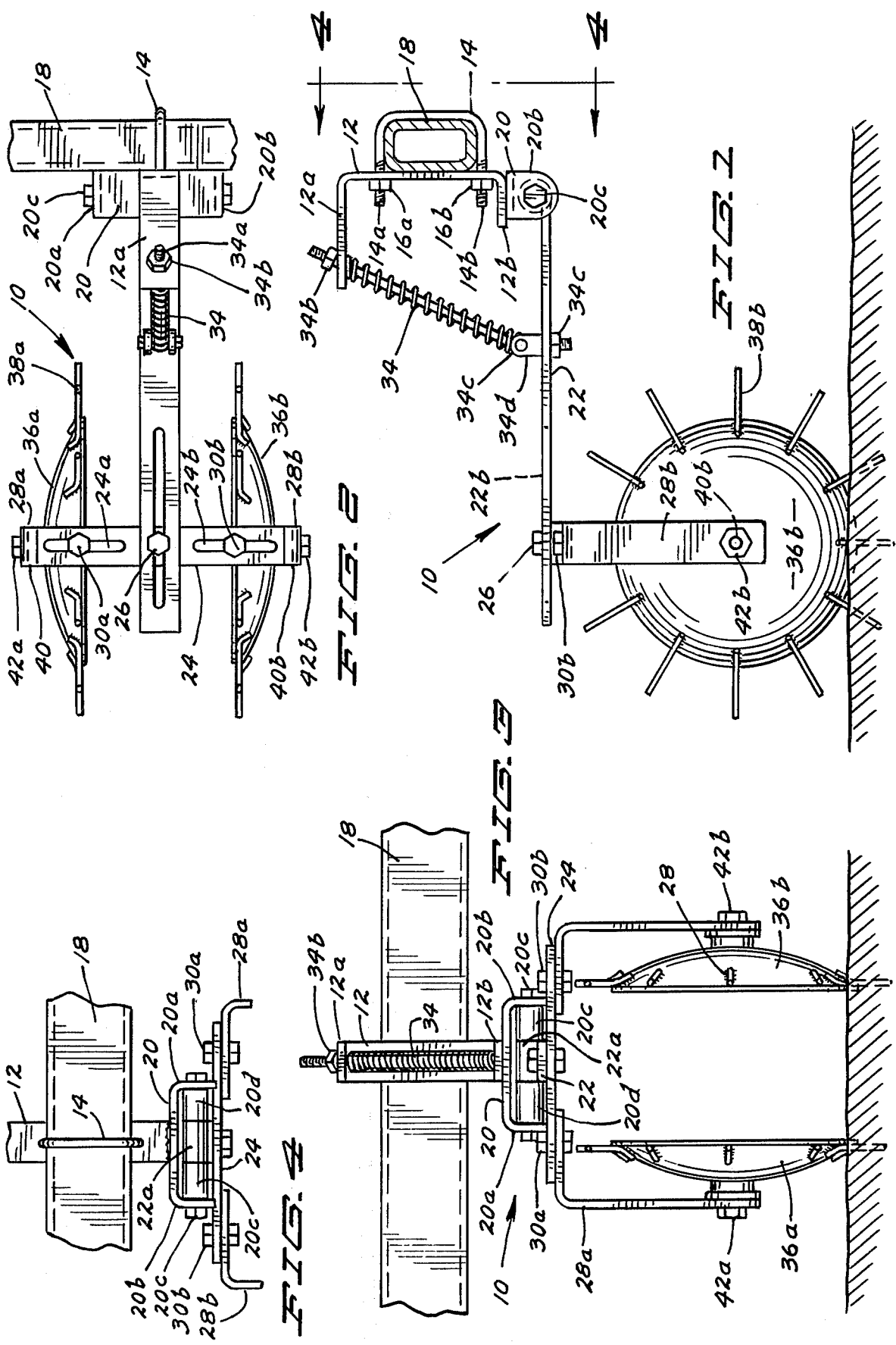

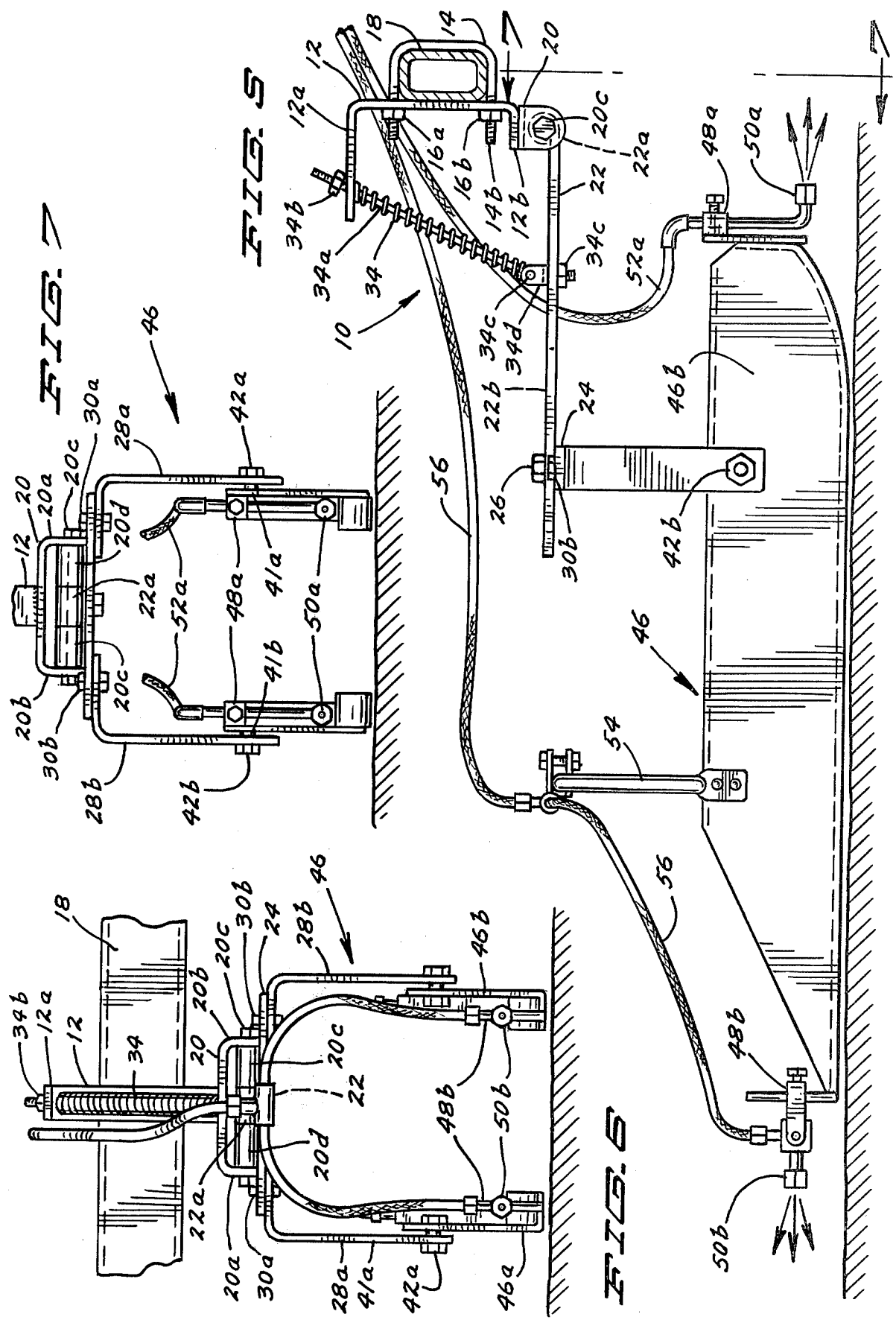

TRACTOR IMPLEMENT CARRYING APPARATUS

BACKGROUND OF THE INVENTION

1. Field of the Invention

The present invention relates generally to farm machinery, and more particularly, pertains to a new tractor implement carrying apparatus wherein the apparatus provides transverse and lateral adjustments to accept various types of farm implements.

2. Description of the Prior Art

In the field of farm machinery, it has been a general practice to employ tractor apparatus to support various types of farm implements. Such tractor apparatus has been unsatisfactory in that the tractor implement carrying apparatus has usually been designed for a specific farm implement. Also, the tractor apparatus did not provide for any adjustment to be accepted by varying space between multiple implements or between different types of farm tractors or other towing mechanisms. Those concerned with the development of farm machinery have long recognized the need for an adjustable tractor implement carrying apparatus. The present invention fills this need.

Prior art tractor apparatus has been void of adjustability either laterally or transversely thereby impeding an agriculturalist or farmer from easily interchanging farm implements from tractor to tractor or in being able to accommodate farm implements for various spacings of the rows between the crops or varying widths of particular crops. If the tractor apparatus was adjustable, the adjustability required numerous mechanical tools in addition to a large effort of mechanical labor to make adjustments. Also, depending upon the crop and the type of field, the spacing of the rows and the crop widths are not always equal therefore requiring the farmer to make adjustments of the spacing of the farm implements on the tractor apparatus to be accepted by the rows of crops and to be accepted by the additions of the field. Consequently, farmers have never been provided with a tractor implement carrying apparatus which is easily adjustable in the field and acceptable by the usual tractor tool bar. The present invention overcomes the shortcoming of the prior art devices.

SUMMARY OF THE INVENTION

The general purpose of this invention is to provide a tractor implement carrying apparatus having none of the described disadvantages of the prior art devices. To obtain this, the present invention provides mechanically adjustable structure to permit transverse adjustment of an implement attaching bracket with transversely adjustable and downwardly extending arms having tool mounting brackets to permit attachment of farm implements, transverse adjustment of a drawbar, and lateral adjustment of the implement attaching bracket on the drawbar.

According to a preferred embodiment of the present invention, there is provided a tractor implement carrying apparatus for attachment to a tractor tool bar having a first mounting member having means for clamping to the tractor tool bar and having the upper ends angled rearwardly; a bushing support member attached transversely to the mounting member lower end, the support member having end tabs with holes therethrough and having an elongated pin of predetermined diameter extending between the end tabs and through the holes; a drawbar having a first end pivotally attached to the pin and having a second slot extending rearwardly thereof; a compression spring attached between the mounting member upper end and the drawbar, and; an implement attaching bracket bolted to the drawbar through the slotted end, the bracket having transversely adjustable and downwardly extending arms for attachment to an implement.

One significant aspect and feature of the present invention is a tractor implement carrying apparatus being adjustable in the transverse as well as the lateral directions thereby permitting an attached farm implement to be accepted by rows of varying widths. Also, the tractor implement carrying apparatus can accept different types of farm implements and to be attached to various types of farm tractors.

Having briefly described an embodiment of the present invention, it is a principal object hereof to provide a tractor implement carrying apparatus.

An object of the present invention is to provide a tractor implement carrying apparatus which permits the use of tool mounting brackets affixed to transversely adjustable and downwardly extending arms and provided with means for attachment to one of a plurality of various different farm implements whether the implements be rolling discs, high speed sliding shields, spray tunnels, etc.

Another object of the present invention is to provide a tractor implement carrying apparatus which provides that the farm implements can be variably spaced to be accepted by variably spaced rows of crops. This is accomplished by appropriately positioning bushing pins and the curled end of the drawbar on the bushing support pin which rotatably mounts in the bushing support member on the first mounting member of the tractor implement carrying apparatus.

A further object of the present invention is to provide a tractor implement carrying apparatus which provides that the implement attaching bracket bolted to the longitudinal slot in the drawbar is laterally adjustable with respect to the first mounting member and the tractor or other towing mechanism to insure alignment of the farm implement with respect to the tractor and the parallel rows of crops.

BRIEF DESCRIPTION OF THE DRAWINGS

Other objects and many of the attendant advantages of this invention will be readily appreciated as the same becomes better understood by reference to the following detailed description when considered in connection with the accompanying drawings, which like reference numerals designate like elements throughout the figures thereof and wherein:

FIG. 1 illustrates a side view of one preferred embodiment of the present invention, a tractor implement carrying apparatus having discs rotatably mounted thereto;

FIG. 2 illustrates a top view of the present invention;

FIG. 3 illustrates a rear end view of the present invention;

FIG. 4 illustrates a section of the present invention taken on line 4—4 of FIG. 1 looking in the directions of the arrows;

FIG. 5 illustrates a side view of another preferred embodiment of the present invention;

FIG. 6 illustrates a rear end view of the present invention, and;

FIG. 7 illustrates a front end view of the present invention.

DESCRIPTION OF THE PREFERRED EMBODIMENTS

FIG. 1, which illustrates a side view of a preferred embodiment of the present invention, a tractor implement carrying apparatus 10, shows a tractor mounting member 12 having rearwardly extending upper and lower angled ends 12a and 12b and having two holes, not shown in the figure for purposes of clarity in the illustrations, in the vertical portion of the tractor mounting member 12 to accept the ends of a U-bolt. A U-bolt 14 having threaded ends 14a and 14b which accepts nuts 16a and 16b affixes the vertical portion of the tractor mounting member 12 to the tractor tool bar 18 with the nuts 16a and 16b. A bushing support member 20 having left and right end tabs 20a and 20b with a holein each end tab, not shown in the figure for purposes of clarity in the illustrations, to accept a bushing pin 20c respectively as illustrated in the end view of FIG. 3. The bushing support member 20 is suitably affixed to the lower angled end 12b, such as by welding by way of example, and for purposes of illustration only. The bushing pin 20c is accepted by the holes in the ends 20a and 20b of the bushing support member 20 and supports a left bushing 20d, a curled end 22a of a drawbar 22 and a right bushing 20e. A longitudinal slot 22b as illustrated in the top view of the tractor implement carrying apparatus 10 of FIG. 2 is provided in the other end of the drawbar 22 opposite the curled end 22a. An implement attaching bracket 24 having left and right longitudinal slots 24a and 24b respectively as illustrated in FIG. 2 attaches to the drawbar 22 with a nut and bolt assembly 26 through the longitudinal slot 22b of the drawbar 22. A transversely adjustable and downwardly extending left and right arm 28a and 28b respectively as also illustrated in FIG. 3 fasten to implement attaching bracket 24 with a nut and bolt assembly 30a and 30b respectively through the longitudinal slots 24a and 24b of the implement attaching bracket 24. A pair of aligned opposing holes are provided in each of the left and right arms 28a and 28b to accept farm implements such as rolling shields, discs, high speed sliding shields, spray attachments, etc. A compression spring 34 mounts on a pivoted threaded rod 34a. A nut 34b secures a threaded portion of the rod 34a to the upper angled end 12a of the tractor mounting member 12. A nut 34c secures the lower end of a threaded member extending from a channel member 34d. A pin 34e extends through the channel member 34d and the lower end of the rod 34a to permit pivoting of the rod 34a around the pin 34e.

In the one preferred embodiment of FIGS. 1-4, a left and right high speed rolling shield 36a and 36b having a plurality of teeth 38a and 38b respectively extending from each shield. Shields 36a and 36b respectively rotatably mount to left and right holes 40a and 40b with suitable nut and bolt assemblies 42a and 42b of the left and right arms 28a and 28b. The shields 36a and 36b are preferably positioned such that the concave portion of each shield faces the concave portion of the other shield as illustrated in FIGS. 2 and 3. In addition arms 28a and 28b are preferably constructed of a length to just permit clearance of teeth 38a and 38b beneath attaching bracket 24, to provide a self-cleaning feature.

FIG. 2 illustrates a top view of the tractor implement carrying apparatus 10 shown in FIG. 1 which supports the high speed rolling shield 36a and 36b where all numerals correspond to the elements previously discussed in preceding paragraph.

FIG. 3 illustrates a rear end view of the tractor implement carrying apparatus 10 shown in FIG. 1 which supports the high speed rolling shield 36a and 36b where all numerals correspond to the elements previously discussed.

FIG. 4 illustrates a section of the tractor implement carrying apparatus 10 taken on line 4—4 of FIG. 1 looking in the direction of the arrows where all numerals correspond to the elements previously discussed.

FIG. 5 illustrates a side view of another preferred embodiment of the present invention of the tractor implement carrying apparatus 10 as previously described where nut and bolt assemblies 42a and 42b and bushings 41a and 41b pivotally attach opposing spray runners 46a and 46b of a high speed sliding shield 46 to the left and right arms 28a and 28b respectively and as also illustrated in the front and rear end views of FIGS. 6 and 7. Brackets 48a and 48b support front and rear spray assemblies 50a and 50b. Forward hoses 52a illustrated in FIG. 7 connect between a liquid spray tank on the tractor to the forward spray assemblies 50a. A rearward hose support 54 having a U-configuration and suitably secured to the spray shields 46a and 46b supports a rear hose 56 which connects between the liquid spray tank to the rear spray assemblies 50b.

FIG. 6 illustrates a rear end view of the tractor implement carrying apparatus 10 which supports the foliage spray runners 46 where all numerals correspond to the elements previously described.

FIG. 7 illustrates a front end view of the tractor implement carrying apparatus 10 which supports the foliage spray runners 46 where all numerals correspond to the elements previously described.

Preferred Mode of Operation

The tractor implement carrying apparatus 10 is attached to the tool bar 18 of a farm tractor or other towing machinery by way of the U-bolt 14 and the nuts 16a and 16b. The curled end 22a of the drawbar 22 is suitably positioned on the bushing pin 20c and appropriately spaced by the left bushing 20d and the right bushing 20e. Depending upon the spacing of the rows, the curled end of the drawbar is transversely positioned on the bushing pin 20c with a bushing 20d and 20e on either side or in the alternative, there can be two bushings 20d and 20e on one side or the other side of the curled end 22a of the drawbar 22. The implement attaching bracket 24 is laterally positioned on the longitudinal slot 22b of the drawbar 22 and secured with the nut and bolt assembly 26. The transversely adjustable and downwardly extending left and right arms 28a and 28b are respectively fastened to the implement attaching bracket 24 with nut and bolt assemblies 30a and 30b through the longitudinal slots 24a and 24b of the implement attaching bracket 24 to permit transverse positioning for proper width alignment of the predetermined farm implement over a crop row.

The left and right tool arms 28a and 28b respectively are provided with holes which provide for the universal mounting of various types of farm implements.

FIGS. 1-4 illustrate a left and right high speed rolling shield 36a and 36b having a plurality of teeth 38a and 38b respectively extending from each shield which is rotatably mounted in left and right holes 40a and 40b with suitable nut and bolt assemblies 42a and 42b. The shields 38a and 38b are positioned so that the concave portion of each shield faces the other concave portion of the other shield as illustrated in FIGS. 2 and 3 which thereby provides an extremely unique and novel structure in that during the rolling operation, the dirt is pushed up and over in a slight mound over the roots of the crops and slightly above the bottom portion of the stem of the crops thereby protecting the roots and stem. This particular novel mounting is most beneficial during farming of crops.

During rolling, the drawbar is suitably biased downwardly by compression spring 34 mounted on the rod 34a and affixed between the upper angled 12a of the tractor mounting member 12 and the mid-portion of the drawbar 22. The threaded rod pivots around pin 34e in U channel 34d and slides through a hole in the upper angled end 12a of the tractor mounting member 12. In the event that the rolling shield strikes a rock, log, hard ground, etc., the drawbar raises upwardly acting against the compression constant of the spring 34 to pass over the foreign object, and is then biased downwardly in a smooth motion by the compression spring 34. The compression spring action 34 is advantageous in providing a smooth operation of the farm implement and prevents the farm implement from flying up towards the rear of the farm tractor or other towing machinery during operation of the farm implement.

FIGS. 5–7 illustrate left and right sliding shields 46a and 46b respectively which is attached to the tractor implement carrying apparatus 10 where bushings, nuts and bolts pivotally attach to the opposing spray runners 46a and 46b of the runners 46 to the left and right tool arms 28a and 28b respectively. Suitable spray attachments are provided at the forward end and rearward end of the runners and hoses connect the spray attachments to a spray tank carried on the tractor or behind the tractor on a trailer. The tractor implement carrying apparatus operates in the same identical manner as previously described with regard to transverse positioning, lateral positioning, and with respect to the adjustable compression spring acting between the upper end of the tractor mounting member 12 and the draw-bar 22 in the event the foliage spray runners 46 come into contact with a foreign object, and addition thereto runners 46 may pivotally move about their respective connections to arms 28a and 28b.

While FIGS. 1–4 have shown rolling disc shields 36a and 36b attached to the tractor implement carrying apparatus and FIGS. 5–7 have shown runners 46a and 46b attached to the tractor implement carrying apparatus 10, any other type of farm implement can be attached to the arms 28a and 28b of the tractor implement carrying apparatus 10.

Various modifications can be made to the tractor implement carrying apparatus of the present invention without departing from the apparent scope thereof.

Having thus described the invention, what is claimed is:

1. A tractor implement carrying apparatus for attachment to a tractor tool bar comprising:
   (a) a first U-shaped mounting member having means for clamping the base of said member to said tractor tool bar and having the legs of said member angled rearwardly in substantial vertical alignment;
   (b) bushing support member attached transversely to said U-shaped mounting member lower leg, said support member having downwardly projecting end tabs with holes therethrough and having an elongated pin of predetermined diameter extending between said end tabs and through said holes;
   (c) drawbar having a first curled end pivotally attached to said pin between said end tabs and having a second slotted end extending rearwardly thereof;
   (d) at least one bushing mounting on said pin adjacent said drawbar and between said end tabs;
   (e) a threaded rod having one end protruding through the upper leg of said U-shaped mounting member and having the other end pivotally attached to said drawbar, and a compression spring mounted about said rod between said upper leg and said pivotal attachment;
   (f) an implement attaching bracket transversely bolted to said drawbar through said slotted end, said bracket having extensible and retractable horizontal arms with downwardly extending ends, each of said ends having an implement attachment hole therein; and
   (g) concave rolling shields rotatably attached to said implement attaching bracket through said implement attaching hole, said shields mounted with the concave portions in facing relationship.

* * * * *